US012140102B2

(12) United States Patent
Peyret-Forcade

(10) Patent No.: US 12,140,102 B2
(45) Date of Patent: Nov. 12, 2024

(54) METHOD FOR DETERMINING A QUANTITY OF FUEL INJECTED INTO AN INTERNAL COMBUSTION ENGINE

(71) Applicant: VITESCO TECHNOLOGIES GMBH, Hanover (DE)

(72) Inventor: Vincent Peyret-Forcade, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 558 days.

(21) Appl. No.: 17/310,294

(22) PCT Filed: Jan. 28, 2020

(86) PCT No.: PCT/EP2020/052056
§ 371 (c)(1),
(2) Date: Jul. 27, 2021

(87) PCT Pub. No.: WO2020/157072
PCT Pub. Date: Aug. 6, 2020

(65) Prior Publication Data
US 2022/0195958 A1 Jun. 23, 2022

(30) Foreign Application Priority Data
Jan. 28, 2019 (FR) ....................................... 1900714

(51) Int. Cl.
*F02D 41/28* (2006.01)

(52) U.S. Cl.
CPC ........ *F02D 41/28* (2013.01); *F02D 2041/286* (2013.01); *F02D 2200/0602* (2013.01);
(Continued)

(58) Field of Classification Search
CPC ............... F02D 41/28; F02D 2041/286; F02D 2200/0602; F02D 2200/0606;
(Continued)

(56) References Cited

U.S. PATENT DOCUMENTS 6,234,148 B1 * 5/2001 Hartke .................. G01L 27/007 123/456
6,463,910 B2 10/2002 Nishiyama
(Continued)

FOREIGN PATENT DOCUMENTS

DE 10 2012 102 907 10/2012
EP 0 969 196 1/2000
WO WO-2011072293 A2 * 6/2011 ................ F02C 9/26

OTHER PUBLICATIONS

International Search Report for PCT/EP2020/052056 dated Mar. 31, 2020, 7 pages.
(Continued)

*Primary Examiner* — Joseph J Dallo
(74) *Attorney, Agent, or Firm* — NIXON & VANDERHYE

(57) ABSTRACT

A method for determining a quantity of fuel injected into a cylinder of an internal combustion engine including an injection rail includes: —measuring the pressure prevailing in the injection rail during fuel injection from the rail into a cylinder; —filtering the pressure measurement; —determining the relative minimum and maximum points of the filtered pressure curve; —insofar as a first (Pdrop1) pressure drop followed by a pressure rise and then a second (Pdrop2) pressure drop is identified, determining a physical quantity that makes it possible to characterize the first pressure drop and the second pressure drop; and —determining the quantity of fuel injected by applying the bulk modulus for the two pressure drops identified as a function of the temperature in the injection rail.

20 Claims, 3 Drawing Sheets

(52) U.S. Cl.
CPC ................ *F02D 2200/0606* (2013.01); *F02D 2200/0614* (2013.01)

(58) Field of Classification Search
CPC ..... F02D 2200/0614; F02D 2200/0608; F02D 2250/02; F02D 41/40; F02D 2041/1432; F02D 2200/0612; F02D 2200/0616
See application file for complete search history.

(56) References Cited

U.S. PATENT DOCUMENTS

| | | | | |
|---|---|---|---|---|
| 2003/0121501 | A1* | 7/2003 | Barnes | F02D 41/2422 123/456 |
| 2005/0193982 | A1* | 9/2005 | Sakai | F02D 41/3845 123/294 |
| 2008/0228374 | A1 | 9/2008 | Ishizuka et al. | |
| 2009/0164086 | A1* | 6/2009 | Geveci | F02D 41/3809 701/102 |
| 2009/0164094 | A1* | 6/2009 | Geveci | F02D 41/3809 123/456 |
| 2010/0250097 | A1 | 9/2010 | Yamada et al. | |
| 2010/0282214 | A1 | 11/2010 | Albrecht et al. | |
| 2010/0319445 | A1* | 12/2010 | Yamada | F02D 41/22 73/114.51 |
| 2012/0253639 | A1* | 10/2012 | Nonoyama | F02D 41/0025 701/103 |
| 2014/0216409 | A1 | 8/2014 | Katsura | |
| 2014/0366845 | A1* | 12/2014 | Kramer | F02D 41/3082 123/445 |
| 2015/0090227 | A1* | 4/2015 | Pursifull | F02M 59/366 123/446 |
| 2015/0159576 | A1* | 6/2015 | Surnilla | F02D 41/2464 701/103 |
| 2015/0240739 | A1* | 8/2015 | Pursifull | F02D 41/008 123/445 |
| 2015/0240769 | A1* | 8/2015 | Zhang | F02M 59/367 123/456 |
| 2015/0240771 | A1* | 8/2015 | Pursifull | F02D 41/0025 73/114.41 |
| 2015/0275816 | A1* | 10/2015 | Pursifull | F02D 41/08 123/456 |
| 2015/0300287 | A1* | 10/2015 | Ulrey | F02D 41/221 701/103 |
| 2015/0354491 | A1* | 12/2015 | Ulrey | F02D 41/3845 123/294 |
| 2016/0084189 | A1* | 3/2016 | Pursifull | F02M 63/0285 123/456 |
| 2016/0177860 | A1* | 6/2016 | Pursifull | F02B 43/12 123/294 |
| 2016/0186682 | A1* | 6/2016 | Surnilla | F02D 41/2464 123/446 |
| 2016/0356237 | A1* | 12/2016 | Pursifull | F02D 41/20 |
| 2018/0328304 | A1* | 11/2018 | Pursifull | F02D 41/3094 |
| 2018/0328306 | A1* | 11/2018 | Pursifull | F02D 41/3094 |
| 2019/0195154 | A1* | 6/2019 | Ahn | F02D 41/0085 |

OTHER PUBLICATIONS

Written Opinion of the ISA for PCT/EP2020/052056 dated Mar. 31, 2020, 6 pages.

* cited by examiner

METHOD FOR DETERMINING A QUANTITY OF FUEL INJECTED INTO AN INTERNAL COMBUSTION ENGINE

CROSS-REFERENCE TO RELATED APPLICATIONS

This application is the U.S. national phase of International Application No. PCT/EP2020/052056 filed Jan. 28, 2020 which designated the U.S. and claims priority to FR 1900714 filed Jan. 28, 2019, the entire contents of each of which are hereby incorporated by reference.

BACKGROUND OF THE INVENTION

Field of the Invention

The invention pertains to the field of managing an internal combustion engine and more particularly managing the fuel injection in such an engine.

Description of the Related Art

In an internal combustion engine, fuel injection increasingly often takes place directly into the cylinder, downstream of the intake valve. This is known as direct injection, as opposed to indirect injection in which the fuel is injected upstream of the intake valve.

The invention relates more particularly to direct-injection engines. In such an engine, the fuel is injected at high pressure, that is of the order of around one hundred bar (1 bar equaling approximately $10^5$ Pa), for example approximately 200 bar. In order to achieve this pressure, a first fuel pump, generally located in the fuel tank or at the outlet thereof, pressurizes the fuel supply circuit to a pressure of the order of a several bar, for example approximately 5 bar. A second fuel pump carries the high-pressure fuel to an injection rail that supplies injectors.

When the second pump is faulty, the engine can still operate in a degraded mode. The pressure of the fuel supplied by the first pump makes it possible to inject fuel into the cylinders of the engine.

However, at lower pressure, the fuel vaporizes more easily. Fuel in gaseous phase is then injected with fuel in liquid phase. The proportion of fuel in gaseous phase must be taken into account in order to inject the correct quantity of fuel into the cylinders.

PRIOR ART

As such, it is known practice to take into account the vaporization of the fuel in the injector by calibrating an injector model. As the vaporization phenomenon is linked to a relatively low pressure and a high local temperature (it takes place very close to the combustion chamber), it is not easy to simulate it in order to estimate both the occurrence of the phenomenon and the impact thereof.

The pressure and the temperature greatly influence the vaporization phenomenon and the use of an injector model does not generally make it possible to adjust the quantity of fuel injected precisely.

In US2010250097A1, an actual maximum fuel injection rate is computed based on a falling waveform and a rising waveform of the fuel pressure. The falling waveform represents the fuel pressure detected by a fuel sensor during a period in which the fuel pressure increases due to a fuel injection rate decrease. The rising waveform represents the fuel pressure detected by the fuel sensor during a period in which the fuel pressure decreases due to a fuel injection rate increase. The falling waveform and the rising waveform are modeled by modeling functions. A reference pressure is computed based on the pressure during a specified period before the falling waveform is generated. An intersection pressure is computed, at which the straight lines expressed by the modeling functions intersect each other. The maximum fuel injection rate is computed based on a fuel pressure drop from the reference pressure to the intersection pressure.

SUMMARY OF THE INVENTION

As such, the aim of the present invention is to provide means that make it possible to improve the precision of the determination of the quantity of fuel injected into the cylinders of an internal combustion engine in a degraded operating mode in which a high-pressure pump is disabled.

A method is proposed for determining a quantity of fuel injected into a cylinder of an internal combustion engine comprising an injection rail.

According to the present invention, the method comprises the following steps:

- measuring the pressure prevailing in the injection rail during fuel injection from the rail into a cylinder,
- filtering the pressure measurement,
- determining the relative minimum and maximum points of the filtered pressure curve,
- insofar as a first pressure drop followed by a pressure rise and then a second pressure drop is identified, determining a physical quantity that makes it possible to characterize the first pressure drop and the second pressure drop,
- determining the quantity of fuel injected by applying the bulk modulus for the two pressure drops identified as a function of the temperature in the injection rail, by determining, using the bulk modulus, an equivalent quantity of fuel injected that corresponds to the first pressure drop and to the second pressure drop, and adding them together.

According to another aspect, a device is proposed for controlling and managing an internal combustion engine, characterized in that it is programmed to implement all of the steps of a method according to the invention.

According to another aspect, a computer program is proposed that contains instructions that lead the device according to the invention to execute the steps of the method according to the invention.

The features disclosed in the paragraphs below can optionally be implemented. They can be implemented independently of each other or in combination with each other:

- the determination method further comprises the following step for the final determination of the quantity of fuel injected:
- adding a corrective term that is determined as a function of at least one of the two physical quantities characterizing the first pressure drop and the second pressure drop;
- the physical quantity selected characterizing the first pressure drop and the second pressure drop is the pressure variation in Pa (or equivalent); in this case, the corrective term can be determined, for example, both as a function of at least one of the two pressure variations and as a function of the total pressure variation, that is the pressure variation between the start of injection and the end of injection;

the physical quantity selected characterizing the first pressure drop and the second pressure drop is the duration of the pressure drop in s (or equivalent); in this case, the corrective term can be determined, for example, both as a function of at least one of the two pressure drop durations and as a function of the time interval between the start of injection and the end of injection, that is between the start of the first pressure drop and the end of the second pressure drop;

the filtering of the pressure measurement is analog hardware filtering;

a digital filter is applied to the pressure measurement; the temperature used for determining the quantity of fuel injected is an estimated temperature.

BRIEF DESCRIPTION OF THE DRAWINGS

Further features, details and advantages of the invention will become apparent on reading the following detailed description and on analyzing the appended drawing, in which.

DESCRIPTION OF THE PREFERRED EMBODIMENTS

The drawings and descriptions below essentially contain elements of definite character. They can therefore not only be used to improve understanding of the present invention but also contribute to the definition thereof, as applicable.

Figure 1:
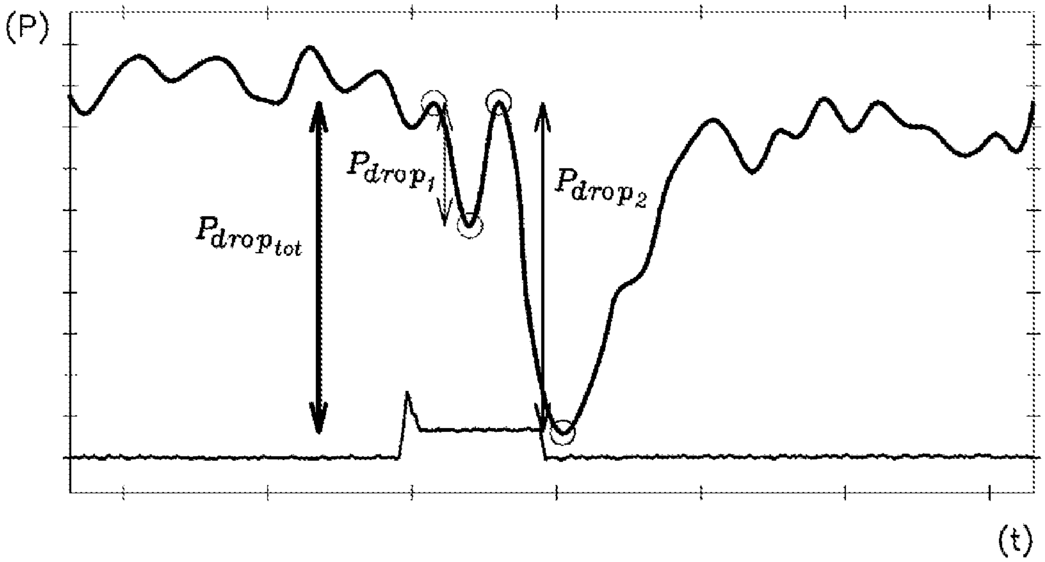
FIG. 1 shows an example of a pressure curve in an injection rail with a curve indicating a signal for controlling injection into a cylinder.

Reference is now made to FIG. 1. This figure shows the pressure in an injection rail of an internal combustion engine in the scenario explained below.

Increasingly often, in an internal combustion engine, the fuel is injected at high pressure directly into the cylinders. In this case, the fuel is pumped out of the tank by a pump, also known as a booster pump, that can be immersed in the fuel tank or is otherwise located in immediate proximity to the tank. This pump makes it possible to pressurize the whole fuel circuit, from the tank to the cylinders of the engine. For the injection of the fuel into the cylinders, the pressure used is of the order of several hundred bar (1 bar=$10^5$ Pa), for example approximately 200 bar. It is then known practice to pressurize fuel in an injection rail to a high pressure, for example using at least one other pump. The injection rail then supplies injectors so that when an injector opens, fuel from the injection rail is sent at high pressure into the corresponding cylinder.

The description below relates to the situation in which the high-pressure pump(s) is/are disabled. In this scenario, the pressure in the injection rail corresponds to the pressure supplied by the booster pump. In this case, the engine is working in a degraded operating mode.

In FIG. 1, the x-axis is a time axis, while the y-axis indicates the pressure prevailing in the injection rail under consideration. A signal corresponding to the opening control signal of an injector is also shown.

It will be noted that when the control signal requests the opening of the injector, the pressure in the injection rail starts to drop. Surprisingly, it has been observed that after a first pressure drop, the pressure in the injection rail increases before falling again to reach a minimum pressure. This rise in the pressure in the rail can be explained by the vaporization of a portion of the fuel that is injected into the cylinder. This fuel is heated, part of it then vaporizes and the fuel vapor causes the pressure in the injection rail to rise.

Three pressure variations are illustrated in FIG. 1:

$Pdrop_{tot}$ is the pressure difference between the start and end of injection;

$Pdrop_1$ is the pressure difference observed on the first pressure drop, that is the pressure difference between the start of injection and the relative minimum pressure, before the pressure in the injection rail increases; and $Pdrop_2$ is the pressure difference observed on the second pressure drop, that is the pressure difference between the relative maximum after the pressure rise and the pressure at the end of injection corresponding to the minimum pressure.

Figure 2:
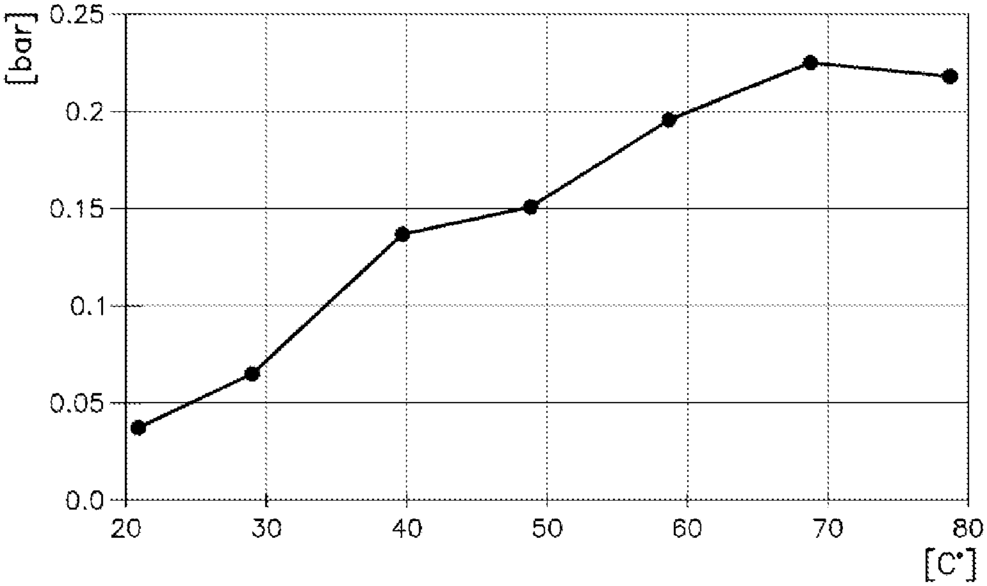
FIG. 2 shows a pressure variation as a function of a fuel temperature.

FIG. 2 illustrates the pressure rise between the two pressure drops. It will be noted that this pressure difference increases with the temperature. This is logical considering that this pressure rise is linked to the effect of the vaporization of the fuel injected into the cylinders.

Figure 3:
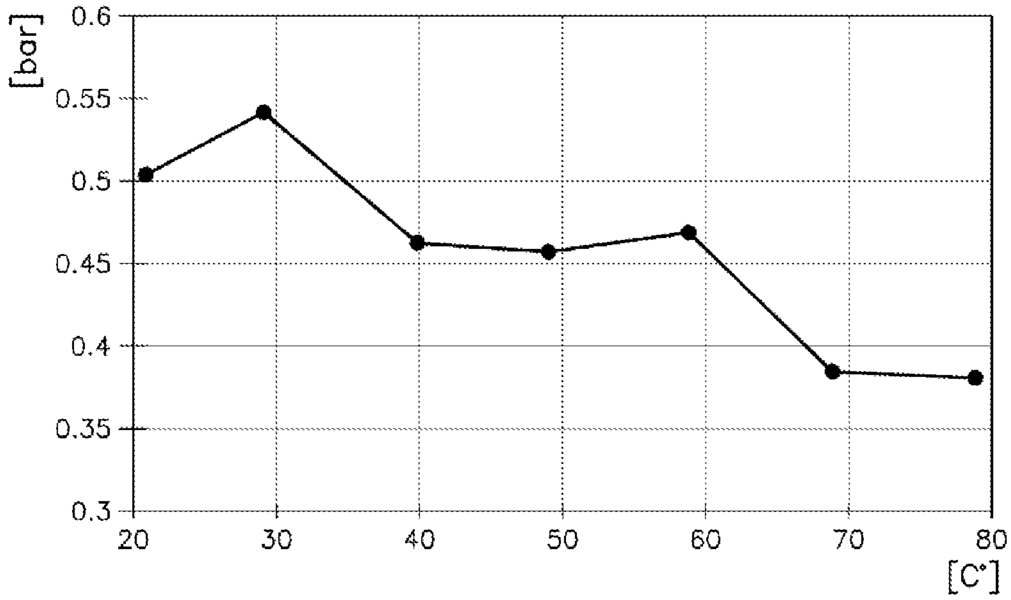
FIG. 3 shows another pressure variation as a function of a fuel temperature.

FIG. 3 illustrates the pressure variation $Pdrop_{tot}$. As can particularly be seen from the figures, all of the pressure variations are considered to be positive, that is, the absolute value of the pressure variation is considered.

It is known from the prior art to determine (or compute) a quantity of fuel injected as a function of the pressure variation measured. This determination depends on the characteristics of the injector and of the fuel, particularly the bulk modulus and temperature of the fuel. The bulk modulus of a given fuel is known. With regard to the temperature, a temperature sensor can provide the information but more often than not, this temperature is estimated on the basis of other measurements taken in the engine.

A person skilled in the art wishing to determine the quantity of fuel injected would thus do so on the basis of the value $Pdrop_{tot}$. Here, it is proposed that the equivalent quantity of fuel injected corresponding both to $Pdrop_1$ and to $Pdrop_2$ be determined using the bulk modulus, and that these be added together. Let $Qinj\_eq_{1+2}$ be the equivalent quantity determined.

Figure 4:
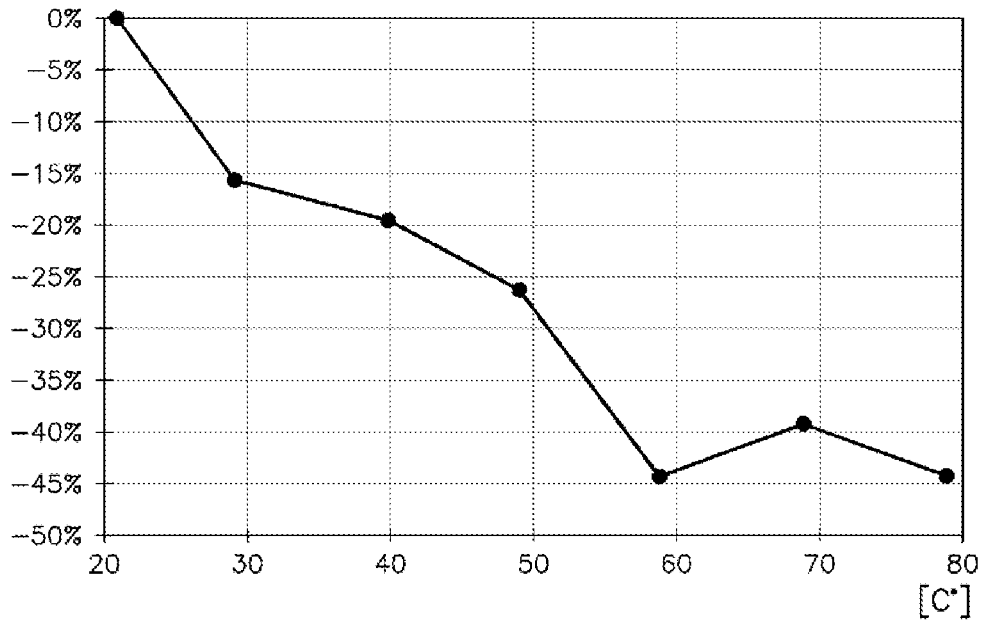
FIG. 4 shows a variation as a function of the temperature of an equivalent quantity of fuel injected compared to said quantity at 20° C.

FIG. 4 shows the variation in the equivalent quantity of fuel injected as a function of temperature. In this figure, the curve represents the ratio $(Qinj\_eq_{1+2\_20}-Qinj\_eq_{1+2})/Qinj\_eq_{1+2\_20}$ where $Qinj\_eq_{1+2\_20}$ is the equivalent quantity of fuel injected at a temperature of 20° C.

It will be noted that in FIG. 4 the variation as a function of temperature is significant.

Figure 5:
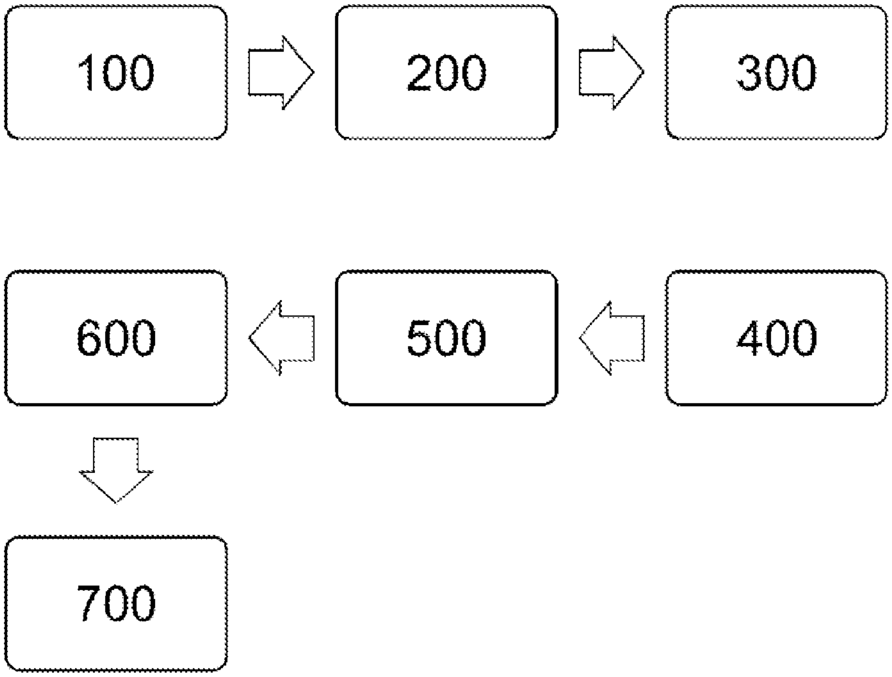
FIG. 5 shows a flow chart for a method for determining a quantity of fuel injected according to one embodiment of the invention.

FIG. 5 is a flow chart for determining the equivalent quantity of fuel injected when the engine described above is operating in a degraded mode that corresponds to a mode in which the means for pressurizing the fuel to a high pressure are disabled.

In FIG. 5, several successive steps, which will be described below, will be noted. The first step 100 corresponds to measuring the pressure in an injection rail, sometimes also known as a common rail, that is connected to injectors that make it possible to inject fuel directly into cylinders of said engine. Conventionally in an engine with an injection rail, a pressure sensor is provided to measure the pressure of the fuel in this rail. The determination method described here does not therefore require, either here or subsequently, specific means in the mechanical part of the engine.

The signal transmitted by the pressure sensor during the measurement taken in step 100 is filtered during a step 200 of the method. Preferably, the filtering is carried out with an analog hardware filter.

Once the signal from the pressure sensor has been filtered, this signal is acquired during a step 300. This acquisition preferably takes place at a high frequency, for example at a frequency of several kHz such as, by way of non-limiting example, 10 kHz. During this step 300 of acquiring the signal, the voltage transmitted by the sensor (and filtered) is converted into a value representative of the pressure prevailing in the injection rail. Digital filtering can also be envisaged during this step 300 after the acquisition of the signal.

Step 300 thus makes it possible to provide a curve giving the pressure prevailing in the injection rail as a function of time. This curve is analyzed in step 400 during the open period of an injector, optionally also shortly after the closing of the injector. The aim of this analysis is to determine the maximum and minimum pressures of the curve. As stated above, it has been noted that the pressure curve falls on the opening of the injector to a relative minimum, then rises before falling again to a minimum. The pressure curve is analyzed at least until the detection of this minimum that follows the closing of the injector. In order to determine these extreme values, conventionally, the relative minimum and maximum points of the curve are sought.

The analysis of the curve carried out in step 400 makes it possible, during a subsequent step 500, to determine the pressure variations in the injection rail. Here, the pressure drops are determined. Reference is made here to FIG. 1, and the electronic means used to implement the method then compute: $Pdrop_{tot}$ is the pressure difference between the first maximum determined on the opening of the injector and the minimum pressure just after the closing of the injector.

$Pdrop_1$ is the pressure difference between the first maximum determined on the opening of the injector and the first minimum pressure, $Pdrop_2$ is the pressure difference between the maximum pressure detected after the first minimum pressure and the minimum pressure just after the closing of the injector.

On the basis of the pressure differences $Pdrop_1$ and $Pdrop_2$, a step 600 provides the computation of the equivalent quantity of fuel injected for each of these pressure differences. Here, the computation is carried out particularly using the temperature of the fuel in the injection rail and also the bulk modulus.

In a variant embodiment for steps 500 and 600, instead of working directly with pressure differences, seconds (or microseconds) could be used as a physical quantity, and not Pascals. Instead of considering the pressure differences, the duration of the pressure drop could be considered. On the basis of these durations, it is also possible to determine an equivalent quantity of fuel injected, mainly as a function of the characteristics of the injector, the temperature and the bulk modulus of the fuel.

During this step 600, both a first equivalent quantity of fuel injected $Qinj\_eq_1$ corresponding to $Pdrop_1$ and a second equivalent quantity of fuel injected $Qinj\_eq_2$ corresponding to $Pdrop_2$ are thus determined. The total equivalent quantity is determined on the basis of these two partial quantities: $Qinj\_eq_{1+2}=Qinj\_eq_1+Qinj\_eq_2$ The value thus determined gives a good approximation of the equivalent quantity of fuel injected during the injection under consideration. However, provision is advantageously made to apply a corrective term to this equivalent quantity. It has been assumed, and observed, that not only do the absolute values of the pressure drops have an influence, but that the ratio between these values also has an influence. In order to take this ratio into account, it is proposed that a corrective term Qcorr be added that can be a function of $Pdrop_1$ and/or Pdrop2 and Pdroptot or of a variable such as for example $$Pdrop_1/Pdrop_{tot}$$

or $$Pdrop_2/Pdrop_{tot}$$

or $$(Pdrop_1+Pdrop_2)/Pdrop_{tot}$$

or $(Qinj\_eq_1+Qinj\_eq_2)/(Qinj\_eq_{tot})$ where $Qinj\_eq_{tot}$ is the equivalent quantity of fuel injected for the pressure drop $Pdrop_{tot}$.

If the decision was taken above to work with the duration of the pressure drops and not directly with the pressures themselves, the corrective term can be a function of:

$T_1$ the duration of the first pressure drop, and/or $T_2$ the duration of the second pressure drop, and $T_{tot}$ the duration between the start of the first pressure drop and the end of the second pressure drop, or one of the variables:

$$T_1/T_{tot}$$

$$T_2/T_{tot}$$

$$(T_1+T_2)/T_{tot}$$

or in this case also $(Qinj\_eq_1+Qinj\_eq_2)/(Qinj\_eq_{tot})$.

A curve then makes it possible to give the value of the correction to be applied to the equivalent quantity injected found above.

The corrective value is thus determined as a function of the measurements (pressure or time) taken in step 500, that is, $Qcorr=f(Pdrop_1, Pdrop_2, Pdrop_{tot})$ or $Qcorr=g(T_1, T_2, T_{tot})$. There could also be a map that gives the corrective value to be applied directly as a function of $Pdrop_1$ and/or $Pdrop_2$ and $Pdrop_{tot}$ (or $T_1$ and/or $T_2$ and $T_{tot}$).

Determining the equivalent quantity of fuel injected, preferably with the corrective value, makes it possible to know what quantity of fuel has been injected and it is then possible to adjust the control of the injectors if a drift is observed relative to the setpoint given. As a result, operation in degraded mode is improved. This satisfactory knowledge of the quantity injected makes it possible to avoid combustion misfires linked to the injection, improve the adjustment of the richness of the air/fuel mix and therefore also improve the control of polluting emissions.

Of course, the present invention is not limited to the preferred embodiment described above or to the variants mentioned, but also covers variant embodiments within the competence of a person skilled in the art.

The invention claimed is:

1. A method for determining a quantity of fuel injected into a cylinder of an internal combustion engine including an injection rail, the method comprising:

measuring the pressure prevailing in the injection rail during fuel injection from the rail into a cylinder, filtering the measured pressure;

determining the relative minimum and maximum points of the filtered pressure curve; when as a first pressure drop followed by a pressure rise and then a second pressure drop is identified, determining a physical quantity respectively characterizing the first pressure drop and the second pressure drop; and determining the quantity of fuel injected by applying the bulk modulus for the two pressure drops identified as a function of the temperature in the injection rail, by determining, using the bulk modulus, an equivalent quantity of fuel injected that corresponds both to the first pressure drop and to the second pressure drop, and adding the equivalent quantity of fuel for each of the first pressure drop and the second pressure drop together, to inject the determined quantity of fuel into the cylinder in a next engine cycle.

2. The determination method as claimed in claim 1, wherein the determining the quantity of fuel injected comprises:

adding a corrective term that is determined as a function of at least one of the two physical quantities characterizing the first pressure drop and the second pressure drop.

3. The determination method as claimed in claim 2, wherein the physical quantity selected respectively characterizing the first pressure drop and the second pressure drop is the pressure variation.

4. The determination method as claimed in claim 3, wherein the corrective term is determined both as a function of at least one of the two pressure variations and as a function of the total pressure variation that is the pressure variation between the start of injection and the end of injection.

5. The determination method as claimed in claim 1, wherein the physical quantity selected respectively characterizing the first pressure drop and the second pressure drop is a duration of the pressure drop.

6. The determination method as claimed in claim 2, wherein the corrective term is determined both as a function of at least one of the two pressure drop durations and as a function of the time interval between the start of injection and the end of injection, that is between the start of the first pressure drop and the end of the second pressure drop.

7. The determination method as claimed in claim 1, wherein the filtering of the pressure measurement is analog hardware filtering.

8. The determination method as claimed in claim 1, wherein the temperature used to determine the quantity of fuel injected is an estimated temperature.

9. A device for controlling and managing an internal combustion engine, the device being programmed to implement the method as claimed in claim 1.

10. A non-transitory computer-readable medium on which is stored a computer program containing instructions, which when executed by the device as claimed in claim 9, causes the device to execute the determination method.

11. The determination method as claimed in claim 1, wherein the physical quantity selected respectively characterizing the first pressure drop and the second pressure drop is the pressure variation.

12. The determination method as claimed in claim 5, wherein the corrective term is determined both as a function of at least one of the two pressure drop durations and as a function of the time interval between the start of injection and the end of injection, that is between the start of the first pressure drop and the end of the second pressure drop.

13. The determination method as claimed in claim 2, wherein the physical quantity selected respectively characterizing the first pressure drop and the second pressure drop is a duration of the pressure drop.

14. The determination method as claimed in claim 2, wherein the filtering of the pressure measurement is analog hardware filtering.

15. The determination method as claimed in claim 3, wherein the filtering of the pressure measurement is analog hardware filtering.

16. The determination method as claimed in claim 4, wherein the filtering of the pressure measurement is analog hardware filtering.

17. The determination method as claimed in claim 5, wherein the filtering of the pressure measurement is analog hardware filtering.

18. The determination method as claimed in claim 2, wherein the temperature used to determine the quantity of fuel injected is an estimated temperature.

19. The determination method as claimed in claim 3, wherein the temperature used to determine the quantity of fuel injected is an estimated temperature.

20. The determination method as claimed in claim 4, wherein the temperature used to determine the quantity of fuel injected is an estimated temperature.

* * * * *